April 11, 1961   R. A. BRIGHT   2,978,751
METHOD OF MAKING COMPOSITE MOLDED PLASTIC WHEELS
Filed May 29, 1958   2 Sheets-Sheet 1
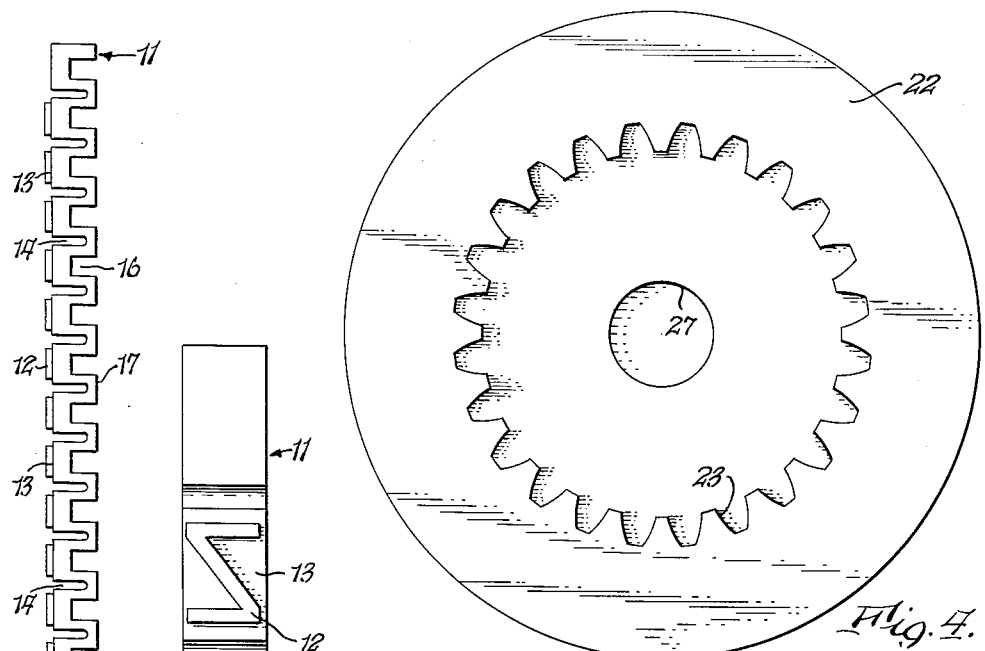
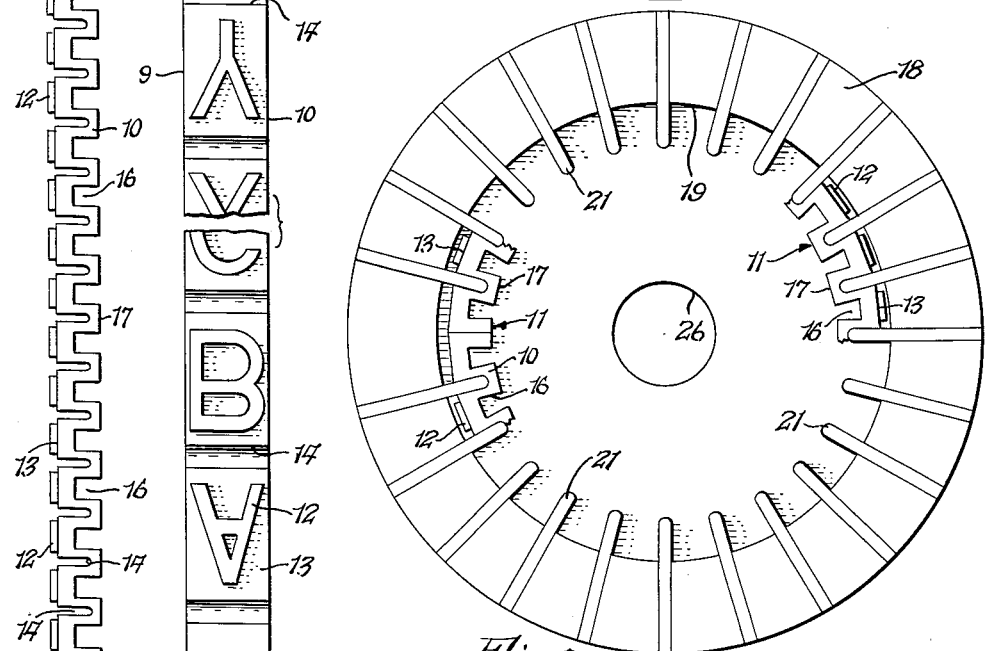
INVENTOR.
BY Roy A. Bright
Popp and Sommer
Attorneys.

April 11, 1961 R. A. BRIGHT 2,978,751
METHOD OF MAKING COMPOSITE MOLDED PLASTIC WHEELS
Filed May 29, 1958 2 Sheets-Sheet 2
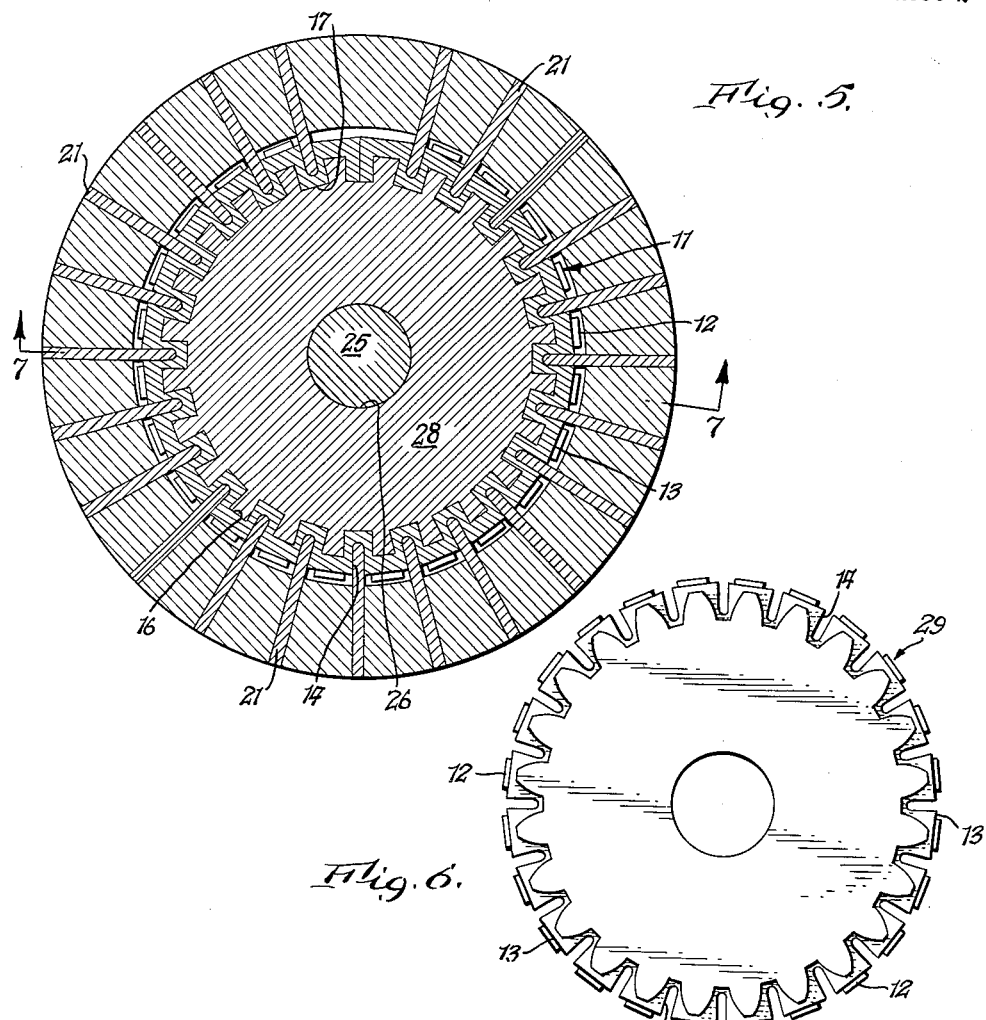
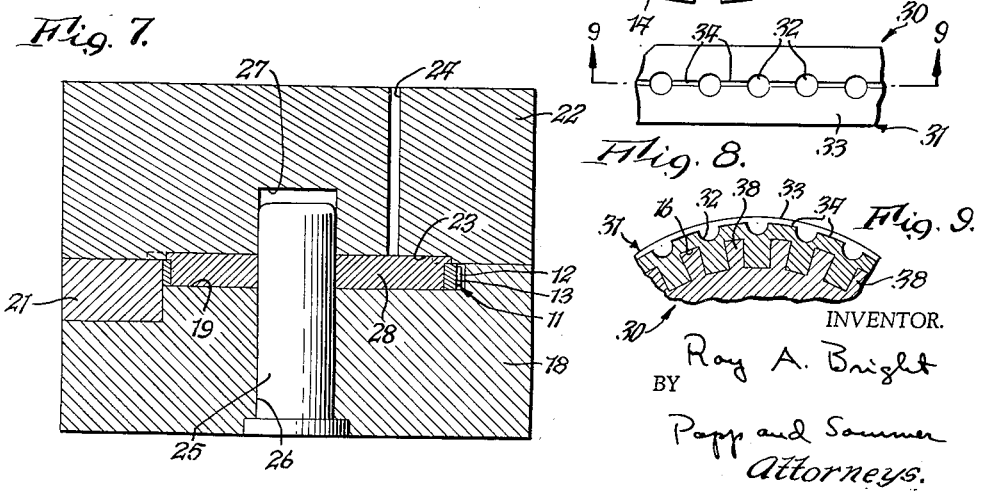
INVENTOR.
Roy A. Bright
BY
Popp and Sommer
Attorneys.

United States Patent Office 2,978,751
Patented Apr. 11, 1961

2,978,751

METHOD OF MAKING COMPOSITE MOLDED PLASTIC WHEELS

Roy A. Bright, Buffalo, N.Y., assignor to Du Bois Plastic Products, Inc., Buffalo, N.Y., a corporation of New York Filed May 29, 1958, Ser. No. 738,800

1 Claim. (Cl. 18—59)

This invention relates to a method of making molded plastic wheels, and is more particularly shown as practiced in conjunction with a composite molded plastic wheel having indicia protruding radially from its periphery, although the invention can also be used in conjunction with molded plastic wheels for other purposes, such as a sprocket for a bead chain.

A molded wheel made in accordance with the invention is characterized by certain novel features, such as, a minimum of distortion of the indicia or offsets extending radially from the periphery, and a positive locking of a strip member forming the peripheral part of the wheel, to the body, or core of the composite wheel. The term "indicia" as used herein is meant to include not only letters, numerals, symbols or other discriminating marks, but also any type of conformation formed upon or within the peripheral surface of the strip, which would provide a utilitarian or artistic function to the molded wheel.

Another feature associated with the wheel made in accordance with the invention is that finishing operations may not be required after final molding.

Further features of the practice of the invention reside in its adaptability to high production techniques thus resulting in low unit cost of manufacture.

The main object of the practice of this invention is to provide a composite molded plastic wheel having indicia or offsets extending radially from its periphery, and which can be produced from a simple mold as compared with the multi-part mold generally required to produce radial protrusions of irregular form from opposite sides of the periphery of a wheel.

A more specific object is the production of a composite molded plastic indicia wheel having a minimum of distortion of the indicia or offsets.

Another more specific object of the invention is the production of a composite molded plastic wheel in which a strip member forming part of the wheel is securely interlocked to the body of the composite wheel.

Another object of this invention is the production of a composite molded plastic wheel wherein finishing operations may not be required after final molding.

Another object is the production of a composite molded plastic wheel which lends itself to high volume production techniques, resulting in low unit cost manufacture.

These and further objects and features of the invention will become more apparent from the following description and accompanying drawing wherein:

Fig. 1 illustrates an indicia bearing peripheral strip used in a printing wheel made in accordance with the invention;

Fig. 2 is an enlarged face view of the strip of Fig. 1;

Fig. 3 is a plan view of a mold cavity showing the strip of Fig. 1 arranged in position prior to molding operation;

Fig. 4 is a similar view of a companion mold cavity to the mold cavity of Fig. 3 illustrating a gear pattern formed on one side of the composite wheel;

Fig. 5 is a view taken through the mold cavity of Fig. 3 after molding of a wheel;

Fig. 6 is a plan view of the molded wheel showing gear teeth formed on one side thereof;

Fig. 7 is a section view, in reduced scale, as seen from line 7—7 in Fig. 5;

Fig. 8 is a fragmentary view of the periphery of a sprocket for a bead chain; and Fig. 9 is a section taken on line 9—9, Fig. 8.

Referring now to the drawing, the numeral 11 identifies a preformed strip of flexible material, which is preferably made of a thermoplastic plastic by a molding process, and which has offset portions or indicia in the form of an alphabet of raised letters 12. As was pointed out hereinbefore, the indicia could be letters, numerals, symbols, or other discriminating marks, as well as any type of conformation formed upon or within the peripheral surface of the strip 11. An example of the last mentioned type of conformation would be uniformly spaced connected recesses for the sprocket of a bead chain as shown in Figs. 8 and 9. Each of the letters 12 are formed upon a relatively flat surface 13 of the preformed strip, each surface 13 being separated by a recess, or transverse slot 14 which extends a given distance into the strip 11 from the surface 13. A plurality of recesses, or transverse slots 16 extend into the strip 11 from a surface 17, the slots 16 being generally equi-spaced between adjacent slots 14. These transverse slots 14, 16 extend from one edge 9 of the strip to the opposite edge 10 thereof. The strip 11 serves as the peripheral portion of a composite wheel the form and making of which will now be described. It will be seen that the surface 13 is divided into a plurality of areas defined by the slots 14 and the edges 9, 10. It will be noted that the recesses 14 extend a substantial distance beyond the recesses 16 so that the strip is longitudinally sinusoidal and highly flexible.

A mold 18, having a circular cavity 19, is arranged with a plurality of indexing blades 21, extending radially into the cavity 19. The depth of the cavity 19 and width of the blades 21 are equal to the width of the strip 11. A cover 22, having a cavity 23 in the form of a spur gear, is arranged for positioning atop the mold 18, said cover having one or more passageways 24 for injecting a thermoplastic material into the cavities 19 and 23. Pin means (not shown) are arranged in the mold 18 for ejecting the composite wheel formed therein. A center pin 25 is arranged to pass through a hole 26 in the mold 18, and project into a bore 27 formed in the cover 22.

To form a composite wheel embodying the principles of the invention, a flexible strip 11 is arranged in the cavity 19 with the indicia bearing surface adjacent the wall of the cavity, and with a blade 21 extending into each recess 14 and in contact with the opposing faces of these recesses as best seen in Fig. 3. It is to be noted that in such position of the strip 11, the recesses 14 open outwardly and the inwardly opening recesses 16 of the strip will each be distorted into slots which decrease in width toward the cavity center. The cover 22 is then placed on top of the mold 18, with the center of each tooth of the recessed spur gear cavity 23 in alinement with the center of a recess 16. Alinement means (not shown) are arranged to assure such alinement. Next, a thermoplastic material is injected into the mold to completely fill the cavities 19 and 23 and form a core 28 of a composite wheel 29. In filling the wedge-shaped slots 16, the core material forms outwardly enlarging keys which positively unite the core to the peripheral strip 11.

The composite wheel 29 is of the type that may be used in a marking mechanism, since the indicia 12 project from the surface of the strip 11 as required for printing operations, while the integral spur gear conformation upon the side may be used for rotating the wheel as desired. It is to be noted that the indicia 12 of the wheel 29, will have a minimum of distortion, since the recesses 14 and 16 allow bending of the strip with little strain being imposed upon the indicia bearing surfaces 13. In addition, it will be seen that the wedge-shaped conformation of the recesses 16 caused by the bending of the strip 11, will securely lock the strip to the core 28, so that separation of the strip from the core under all conditions of use is virtually impossible.

While the composite wheel 29 above described would find utility primarily as a marking wheel, it will be apparent that the principles of the invention may be applied to produce composite wheels for many different uses, any one of which will be determined by the type of indicia used on the strip 11.

For example, the invention can be embodied in the sprocket wheel 30 for a bead chain. For such use the thermoplastic plastic strip 31, coresponding to the thermoplastic plastic strip 11 has radial offsets produced in the outer face 33 thereof in the form of a plurality of regularly spaced hemispherical recesses 32 connected by alining central shallow recesses 34. The strip 31 is shown as having transverse inwardly opening slots 16 in alternate arrangement with the recesses 32 and which, with the strip 31 in circular form diminish in width toward the wheel center so as to positively key to the plastic material 38 of the core. It will be seen that the sprocket 30 can be produced in the same manner as the printing wheel shown in Figs. 5, 6 and 7 with its recesses 32 at the required accuracy for use with a bead chain (not shown).

The foregoing description has been given in detail without thought of limitation since the inventive principles involved are capable of assuming other physical embodiments without departing from the spirit of the invention and the scope of the appended claim.

What is claimed is:

The method of making a composite wheel, which comprises forming a strip of flexible thermoplastic plastic material to have side edges and to have a series of transverse slots along one face arranged in alternation with a series of transverse slots along the other face, said slots extending from one edge to the other, arranging said strip in a circle with one face forming the periphery thereof and holding said strip by contact with the opposing faces of the slots along said face forming the periphery, pouring a thermoplastic plastic material into said circle to bond to the inner face of said strip and to the faces of the slots in said inner face.

References Cited in the file of this patent

UNITED STATES PATENTS

| | | |
|---|---|---|
| 178,528 | Janeway | June 13, 1876 |
| 758,486 | Such | Apr. 26, 1904 |
| 1,332,169 | Ellis | Feb. 24, 1920 |
| 2,280,096 | Norrison | Apr. 21, 1942 |
| 2,589,682 | Dudis | Mar. 18, 1952 |
| 2,734,227 | Costick et al. | Feb. 14, 1956 |
| 2,745,138 | Beattie | May 15, 1956 |
| 2,825,279 | Gottscho | Mar. 4, 1958 |
| 2,832,995 | McCaw | May 6, 1958 |